(12) United States Patent
Takeyama et al.

(10) Patent No.: US 12,101,057 B2
(45) Date of Patent: Sep. 24, 2024

(54) SOLAR POWER GENERATION SYSTEM

(71) Applicant: OMRON Corporation, Kyoto (JP)

(72) Inventors: Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/138,737

(22) Filed: Apr. 25, 2023

(65) Prior Publication Data

US 2023/0353088 A1 Nov. 2, 2023

(30) Foreign Application Priority Data

May 2, 2022 (JP) .................................. 2022-076266

(51) Int. Cl.
*H02S 40/36* (2014.01)
*H02H 7/20* (2006.01)
*H02S 40/32* (2014.01)
*H02J 13/00* (2006.01)

(52) U.S. Cl.
CPC .............. *H02S 40/36* (2014.12); *H02H 7/20* (2013.01); *H02S 40/32* (2014.12); *H02J 13/00036* (2020.01); *H02J 2300/24* (2020.01)

(58) Field of Classification Search
CPC .......... H02S 40/36; H02S 40/32; H02S 50/00; H02H 7/20; H02J 13/00036; H02J 2300/24
See application file for complete search history.

(56) References Cited

U.S. PATENT DOCUMENTS

| 2016/0049537 A1* | 2/2016 | Ueda | H01L 31/0504 |
| | | | 136/244 |
| 2017/0271875 A1* | 9/2017 | Narla | H02S 40/32 |
| 2019/0027617 A1* | 1/2019 | Varlan | H02S 50/10 |
| 2021/0281065 A1* | 9/2021 | Zhu | H02S 40/32 |

FOREIGN PATENT DOCUMENTS

| JP | 2012-511299 A | 5/2012 |
| WO | 2010/065043 A1 | 6/2010 |

* cited by examiner

*Primary Examiner* — Michael Y Sun
(74) *Attorney, Agent, or Firm* — SHINJYU GLOBAL IP

(57) ABSTRACT

A solar power generation system includes a string, an inverter, and a plurality of shut-off devices. The string includes a plurality of solar cell module groups. The plurality of shut-off devices is configured to cut off the connection between the plurality of solar cell module groups in response to a control signal from the inverter. The plurality of solar cell module groups includes a first group, a second group connected to the first group, and a third group connected to the second group. The plurality of shut-off devices includes a first shut-off device. The first shut-off device includes a first open-close unit connected to an anode-side terminal of the second group and a second open-close unit connected to a cathode-side terminal of the second group.

15 Claims, 8 Drawing Sheets

| OPERATION MODE | | WEATHER SUNLIGHT | POWER GENERATION | CONTROL SIGNAL | RELAY OPERATION MODE |
|---|---|---|---|---|---|
| START | | ☀ | YES | ON | ON |
| ACTIVE | | ☀ | YES | ON | ON |
| SAFETY | NORMAL CUTOFF | 🌙☁ | NO | OFF | OFF |
| | | ⛅ | UNSTABLE | ON | ON/OFF |
| | EMERGENCY SAFETY CUTOFF | ☀ | YES | OFF | OFF |

FIG. 5

SOLAR POWER GENERATION SYSTEM

CROSS-REFERENCE TO RELATED APPLICATION

This application claims priority to Japanese Patent Application No. 2022-076266, filed May 2, 2022. The contents of that application are incorporated by reference herein in their entirety.

FIELD

The present invention relates to a solar power generation system.

BACKGROUND

In the United States, for the purpose of protecting firefighters from electric shock in an emergency such as a fire, the introduction, into a solar power generation system, of a so-called rapid shutdown function for immediately stopping the power generation by a solar power generation system in an emergency is mandated by National Electrical Code (NEC). For example, Published Japanese Translation No. 2012-511299 of the PCT International Publication discloses a solar power generation system in which the output of power from solar cell modules to an inverter is stopped according to the operating state of the inverter.

SUMMARY

In a solar power generation system, in order to further improve the safety of firefighters in the event of a fire, for example, preferably a shut-off device having the rapid shutdown function is installed for each solar cell module. However, the shut-off device for each solar cell module increases the installation cost of the shut-off devices.

An object of the present invention is to provide a solar power generation system that achieves both the decrease in installation cost of shut-off devices and the improvement of stability of the solar power generation system.

A solar power generation system according to one aspect of the present invention includes a string, an inverter, a plurality of shut-off devices. The string includes a plurality of solar cell module groups connected in series with each other. The plurality of solar cell module groups each include one or a plurality of solar cell modules connected in series with each other. The inverter is connected to the string and is configured to convert DC power output from the solar cell modules to AC power. The plurality of shut-off devices is configure to cut off electrical connections between the plurality of solar cell module groups in response to a control signal from the inverter. The plurality of solar cell module groups each have an open circuit voltage equal to or less than a predetermined open circuit voltage. The plurality of solar cell module groups includes a first group, a second group connected to the first group, and a third group connected to the second group. The plurality of shut-off devices includes a first shut-off device. The first shut-off device includes a first open-close unit connected to an anode-side terminal of the second group and a second open-close unit connected to a cathode-side terminal of the second group.

In this solar power generation system, the connection between the first group and the second group and the connection between the second group and the third group can be cut off by the first open-close unit and the second open-close unit of the first shut-off device. That is, since the connection of the plurality of groups can be cut off with one shut-off device, the installation cost of the plurality of shut-off devices can be reduced as compared with the case where a shut-off device is installed for each solar cell module. In addition, it is possible to provide a safer solar power generation system as compared with the case of severing the plurality of solar cell modules and the inverter in a string unit.

The first shut-off device may further include a first bypass device connected in parallel with the second group. In this case, even if the amount of power generated by the second group decreases, the power generated by another solar cell module group can be transferred to the inverter via the first bypass device.

The first shut-off device may be configured in a manner that allows opening and closing of the first open-close unit and the second open-close unit to be controlled independently of each other. In this case, for example, when a defect such as a contact failure occurs in the first open-close unit, it is possible to continue to use the second open-close unit that is operating normally.

The first shut-off device may be driven by an electrical power generated by the second group. In this case, when the first shut-off device is disposed in an existing solar power generation system, additional wiring for connecting the inverter and the first shut-off device can be omitted. Thus, the installation cost of the first shut-off device can be reduced. Further, the drive voltage range of the first shut-off device can be narrowed, reducing the manufacturing cost of the first shut-off device.

At least one of the first group, the second group, or the third group of the plurality of solar cell module groups may include the plurality of solar cell modules connected in series. In this case, the plurality of solar cell modules can be cut off collectively by the first shut-off device.

The first shut-off device may include a signal receiving unit configured to receive the control signal from the inverter, and a bypass circuit configured to cause the signal receiving unit to receive the control signal from the inverter in a state where the connection between the plurality of solar cell module groups is shut off. In this case, in a state where the connection between the plurality of solar cell module groups is cut off, the signal receiving unit can receive the control signal from the control unit via the bypass circuit.

The plurality of solar cell module groups may further include a fourth group connected to the third group, and a fifth group connected to the fourth group. The plurality of shut-off devices may further include a second shut-off device. The second shut-off device includes a third open-close unit connected to an anode-side terminal of the fourth group and a fourth open-close unit connected to a cathode-side terminal of the fourth group. In this case, the connection between the third group and the fourth group and the connection between the fourth group and the fifth group can be cut off by the third open-close unit and the fourth open-close unit of the second shut-off device.

The second shut-off device may further include a second bypass device connected in parallel with the fourth group. In this case, even if the amount of power generated by the fourth group decreases, the power generated by another solar cell module group can be transferred to the inverter via the second bypass device.

The second shut-off device may be configured in a manner that allows opening and closing of the third open-close unit and the fourth open-close unit to be controlled independently of each other. In this case, for example, when a defect such as a contact failure occurs in the third open-close unit, it is possible to continue to use the fourth open-close unit that is operating normally.

The second shut-off device may be driven by an electrical power generated by the fourth group. In this case, when the second shut-off device is disposed in an existing solar power generation system, additional wiring for connecting the inverter and the second shut-off device can be omitted. Thus, the installation cost of the second shut-off device can be reduced. Further, the drive voltage range of the second shut-off device can be narrowed, reducing the manufacturing cost of the second shut-off device.

At least one of the third group, the fourth group, or the fifth group of the plurality of solar cell module groups may include the plurality of solar cell modules connected in series. In this case, the plurality of solar cell modules can be cut off collectively by the second shut-off device.

The plurality of solar cell module groups in the string may each have an open circuit voltage of 165 V or less. In this case, a safer solar power generation system can be provided.

The inverter may be configured to output the control signal to the plurality of shut-off devices by power line communication. In this case, when the plurality of shut-off devices is disposed in an existing solar power generation system, additional wiring for ensuring the communication between the inverter and the plurality of shut-off devices can be omitted, which reduces the installation cost of the plurality of shut-off devices.

The inverter may be configured to output the control signal to the plurality of shut-off devices by wireless communication. In this case, the control signal can be output to the plurality of shut-off devices by remote control.

BRIEF DESCRIPTION OF THE DRAWINGS

FIG. 5 is a diagram illustrating an example of an operation mode of a shut-off device.

DETAILED DESCRIPTION

Figure 1:
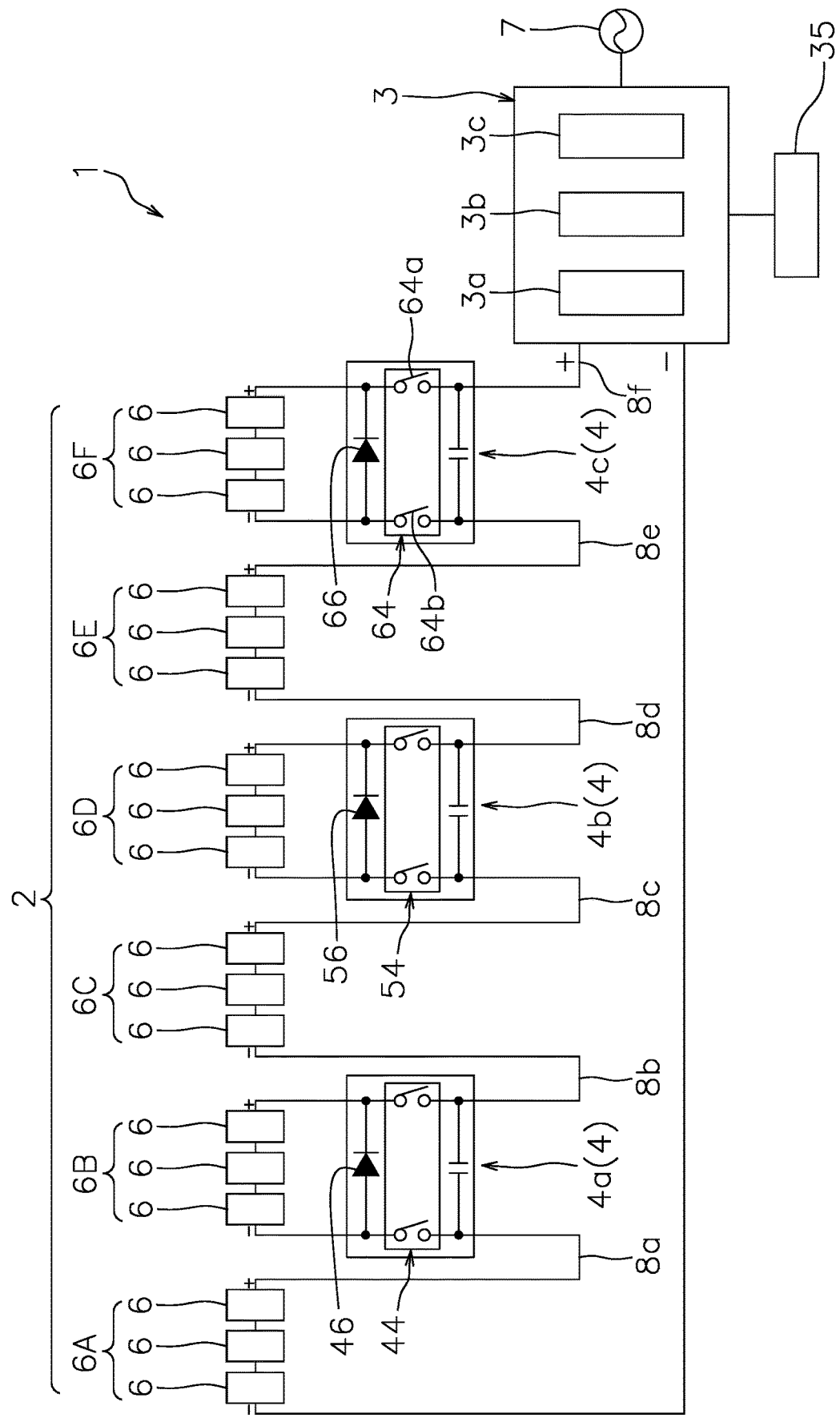
FIG. 1 is a block diagram schematically showing a configuration of a solar power generation system according to an aspect of the present invention.

FIG. 1 is a block diagram schematically showing a configuration of a solar power generation system 1 according to an aspect of the present invention. The solar power generation system 1 includes a string 2, an inverter 3, a plurality of shut-off devices 4.

The string 2 includes a plurality of solar cell module groups connected in series with each other. Each of the plurality of solar cell module groups includes one or a plurality of solar cell modules 6 connected in series. That is, the string 2 includes a plurality of (18 in the present embodiment) solar cell modules 6 connected in series with each other. The plurality of solar cell module groups in the present embodiment includes six solar cell module groups 6A to 6F. Note that the solar power generation system 1 may include a solar cell array in which a plurality of strings 2 are connected in parallel.

Each of the plurality of solar cell module groups 6A to 6F has an open circuit voltage equal to or less than a predetermined open circuit voltage. The predetermined open circuit voltage is, for example, 165 V. That is, in the string 2, the plurality of solar cell module groups is divided into groups so that each group has an open circuit voltage of 165 V or less. The solar cell modules 6 have an open circuit voltage of 50 V, for example. Hereinafter, the solar cell module groups 6A to 6F may be referred to as groups 6A to 6F. The groups 6A to 6E in this embodiment are examples of first to fifth groups.

Each of the groups 6A to 6F includes three solar cell modules 6 connected in series with each other. Thus, each of the open circuit voltages of the groups 6A to 6F is 150 V.

The groups 6A to 6F are arranged in alphabetical order from the group 6A to the group 6F and are connected in series with each other. The groups 6A to 6F each include an anode-side terminal and a cathode-side terminal. The anode-side terminal in each of the groups 6A to 6F corresponds to the anode-side terminal of the solar cell modules 6 closest to the anode of the inverter 3 among the plurality of solar cell modules 6 in the groups 6A to 6F. The cathode in each of the groups 6A to 6F corresponds to the cathode-side terminal of the solar cell modules 6 farthest from the anode of the inverter 3 among the plurality of solar cell modules 6 in the groups 6A to 6F.

The anode-side terminal of the group 6A corresponds to the anode-side terminal of the solar cell module 6 closest to the group 6B among the plurality of solar cell modules 6 in the group 6A and is connected to the cathode-side terminal of the group 6B. The cathode-side terminal of the group 6A corresponds to the cathode-side terminal of the solar cell module 6 farthest from the group 6B among the plurality of the solar cell modules 6 in the group 6A and is connected to the cathode-side terminal of the inverter 3.

The anode-side terminal of the group 6B corresponds to the anode-side terminal of the solar cell module 6 closest to the group 6C among the plurality of solar cell modules 6 in the group 6B and is connected to the cathode-side terminal of the group 6C. The cathode-side terminal of the group 6B corresponds to the cathode-side terminal of the solar cell module 6 closest to the group 6A among the plurality of the solar cell modules 6 in the group 6B and is connected to the anode-side terminal of the group 6A.

The anode-side terminal of the group 6C is connected to the cathode-side terminal of the group 6D. The cathode-side terminal of the group 6C is connected to the anode-side terminal of the group 6B. The anode-side terminal of the group 6D is connected to the cathode-side terminal of the group 6E. The cathode-side terminal of the group 6D is connected to the anode-side terminal of the group 6C. The anode-side terminal of the group 6E is connected to the cathode-side terminal of the group 6F. The cathode-side terminal of the group 6E is connected to the anode-side terminal of the group 6D. The anode-side terminal of the group 6F is connected to the anode-side terminal of the inverter 3. The cathode-side terminal of the group 6F is connected to the anode-side terminal of the group 6E.

The solar cell modules 6 receive sunlight to generate power, and output the generated electrical power to the inverter 3. The inverter 3 is connected to the string 2 via a power line. The inverter 3 converts the DC power from the solar cell modules 6 in the string 2 into AC power. The inverter 3 is connected to a power system 7 and supplies the AC power to the commercial power system or load devices.

Specifically, the inverter 3 includes a DC/DC converter 3*a*, a DC/AC inverter 3*b*, and a control unit 3*c*. The DC/DC converter 3*a* converts the voltage of the electrical power output from the solar cell modules 6 into a predetermined voltage and inputs it to the DC/AC inverter 3*b*. The DC/AC inverter 3*b* converts, via the DC/DC converter 3*a*, the DC power output from the solar cell modules 6 into AC power. The control unit 3*c* includes a CPU and memory, and controls the DC/DC converter 3*a* and the DC/AC inverter 3*b*. The control unit 3*c* outputs a control signal to the plurality of shut-off devices 4 by power line communication.

The plurality of shut-off devices 4 is connected to electric paths connecting between the groups 6A to 6F. The plurality of shut-off devices 4 cuts off the connections between the groups 6A to 6F in response to the control signal output from the inverter 3. In the present embodiment, the plurality of shut-off devices 4 includes three shut-off devices 4*a* to 4*c*. The shut-off device 4*a* in this embodiment is an example of a first shut-off device, and the shut-off device 4*b* in this embodiment is an example of a second shut-off device.

The shut-off device 4*a* is connected to an electric path 8*a* connecting the group 6A and the group 6B and an electric path 8*b* connecting the group 6B and the group 6C. The shut-off device 4*a* cuts off the connection between the group 6A and the group 6B and the connection between the group 6B and the group 6C in response to the control signal from the inverter 3. Specifically, the shut-off device 4*a* cuts off the electrical paths 8*a* and 8*b* by cutting off the voltage output from the solar cell module 6 of the group 6B in response to the control signal from the inverter 3. As a result, the connection between the group 6A and the group 6B and the connection between the group 6B and the group 6C are cut off.

The shut-off device 4*a* is driven by the electrical power generated by the solar cell modules 6 of the group 6B. The shut-off device 4*a* is externally attached to the solar cell modules 6 of the group 6B, for example.

Figure 2:
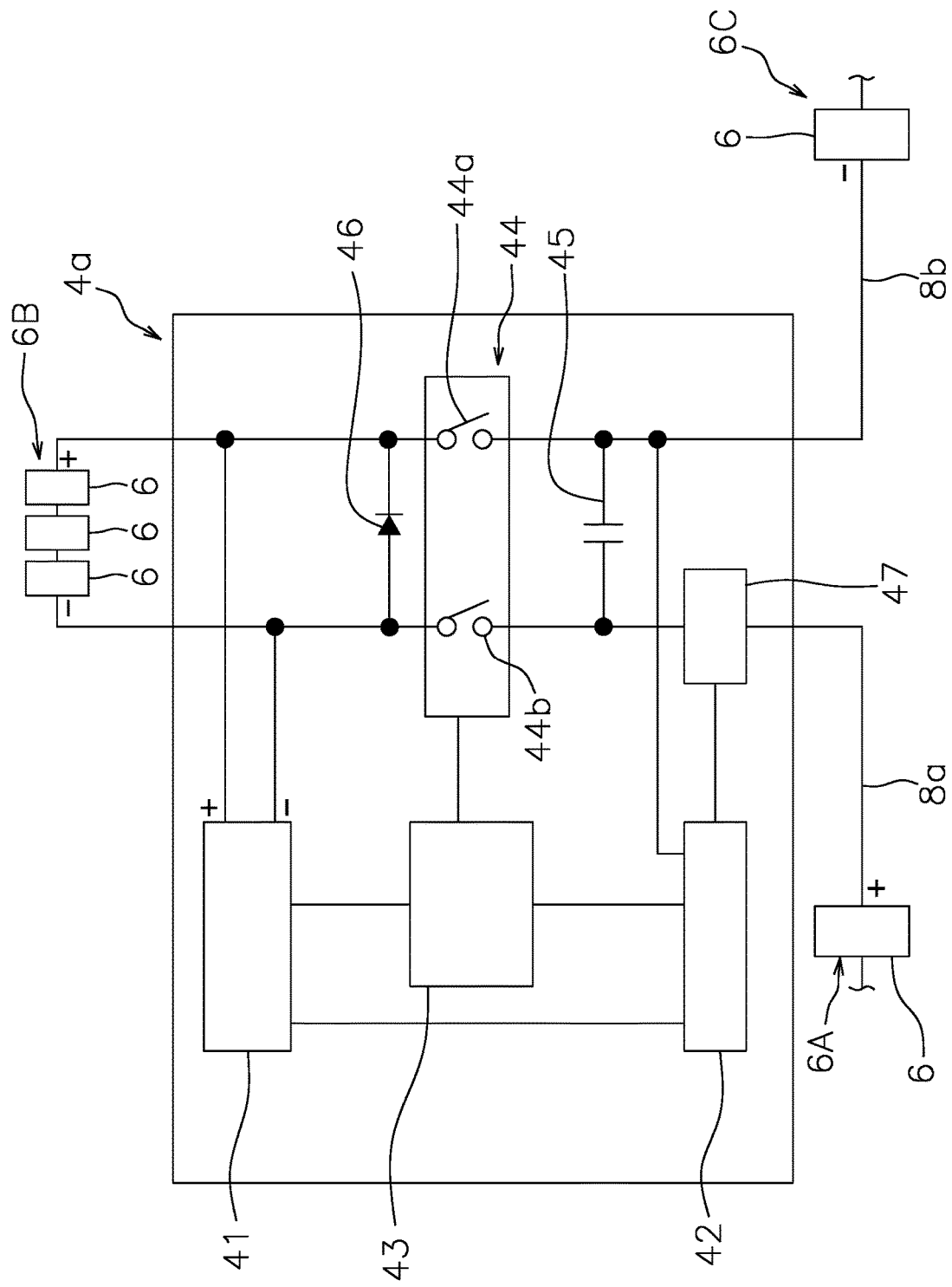
FIG. 2 is a block diagram schematically showing a configuration of a shut-off device.

FIG. 2 is a block diagram schematically showing a configuration of the shut-off device 4*a*. The shut-off device 4*a* includes a power supply unit 41, a signal receiving unit 42, a control unit 43, a relay 44, a bypass circuit 45, a bypass device 46, and a signal detection unit 47.

The power supply unit 41 is a regulator connected in parallel to the group 6B. Specifically, the anode-side terminal of the power supply unit 41 is connected to the anode-side terminal of the group 6B, and the cathode-side terminal of the power supply unit 41 is connected to the cathode-side terminal of the group 6B.

Figure 3:
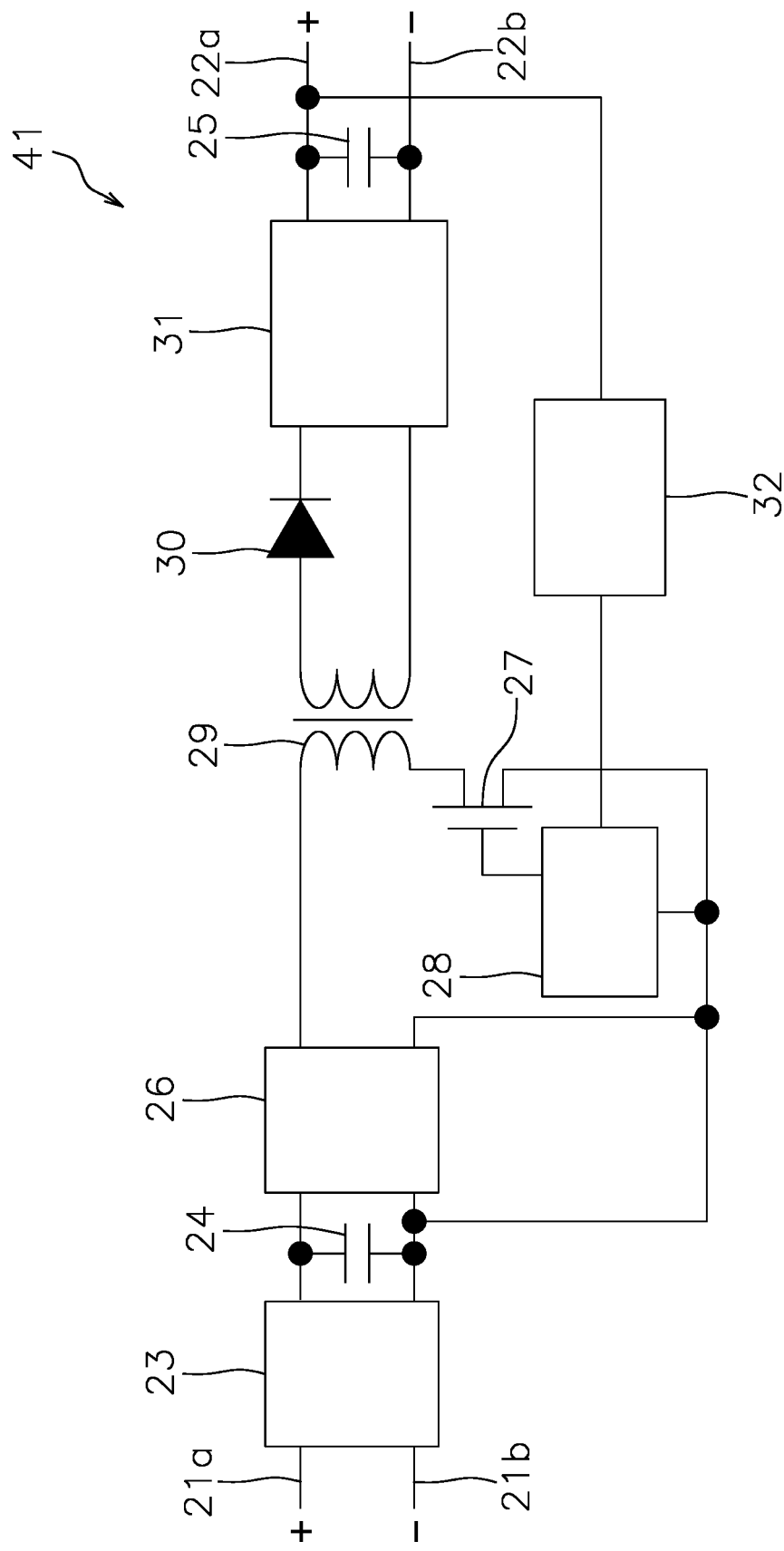
FIG. 3 is a circuit diagram schematically showing a configuration of a regulator.

FIG. 3 is a circuit diagram schematically showing a configuration of the power supply unit 41. The power supply unit 41 includes input terminals 21*a* and 21*b*, output terminals 22*a* and 22*b*, a line filter 23, capacitors 24 and 25, a booster circuit 26, a switching element 27, a control circuit 28, a transformer 29, a diode 30, a DC/DC converter 31, a feedback circuit 32 and the like.

The power supply unit 41 uses the electrical power generated by the solar cell module 6 as a power source to generate a drive power for driving the shut-off device 4*a*. Here, only the power generated by the solar cell modules 6 of the group 6B is used to generate the drive power to drive the shut-off device 4*a*.

The signal receiving unit 42 receives the control signal from the control unit 3*c* of the inverter 3 and outputs the received control signal to the control unit 43. Specifically, the signal receiving unit 42 receives the control signal from the control unit 3*c* of the inverter 3 via the signal detection unit 47 that detects the control signal from the control unit 3*c* of the inverter 3.

The control unit 43 includes a CPU and memory. The control unit 43 controls the electric current flowing through the coil in the relay 44 based on the signals output from the signal receiving unit 42, and controls the opening and closing of the contacts of the relay 44. The relay 44 is, for example, a mechanical relay, and is able to open and close a high-voltage direct current.

The relay 44 includes a first open-close unit 44*a* and a second open-close unit 44*b*. The first open-close unit 44*a* is connected to the anode-side terminal of the group 6B. The first open-close unit 44*a* is disposed in the electric path 8*b*. The first open-close unit 44*a* opens and closes the connection between the group 6B and the group 6C. The second open-close unit 44*b* is connected to the cathode-side terminal of the group 6B. The second open-close unit 44*b* is disposed in the electric path 8*a*. The second open-close unit 44*b* opens and closes the connection between the group 6A and the group 6B. Hereinafter, the first open-close unit 44*a* and the second open-close unit 44*b* may be referred to as open-close units 44*a* and 44*b*.

While the shut-off device 4*a* is not supplied with drive power from the power supply unit 41, the open-close units 44*a* and 44*b* are in an open state all the time. Accordingly, while the shut-off device 4*a* is not driven, the connection between the group 6A and the group 6B and the connection between the group 6B and the group 6C are in a cutoff state.

The bypass circuit 45 is a circuit for allowing the signal receiving unit 42 to receive the control signal from the control unit 3*c* in a state where the connection between the group 6A and the group 6B and the connection the group 6B and the group 6C are cut off. In a state where the connection between the group 6A and the group 6B and the connection the group 6B and the group 6C are cut off, the signal receiving unit 42 can receive the control signal from the control unit 3*c* via the bypass circuit 45.

The bypass device 46 is connected in parallel to the group 6B. Specifically, the bypass device 46 has one end connected between the cathode-side terminal of the group 6B and the second open-close unit 44*b*. The bypass device 46 has the other end connected between the anode-side terminal of the group 6B and the first open-close unit 44*a*. The bypass device 46 is, for example, a diode having an anode connected between the cathode-side terminal of the group 6B and the second open-close unit 44*b* and a cathode connected between the anode-side terminal of the group 6B and the first open-close unit 44*a*.

When the solar cell modules of the group 6B are shaded at sunrise or sunset, sometimes sufficient power cannot be output from the group 6B due to an abnormality such as a sudden power drop or abnormal heat generation in the group 6B. At that time, the bypass device 46 forms an electric path that "bypasses" the group 6B and transfers the power generated by the other solar cell module groups. Specifically, when the open-close units 44*a* and 44*b* enter the closed state, the bypass device 46 forms a path through which the power generated by the other solar cell module groups is transferred to the inverter 3.

When the group 6B cannot output sufficient power, the bypass device 46 is able to immediately form an electric path that bypasses the group 6B in which an abnormality has occurred, based on its own electrical characteristics without any command of an external signal.

It should be noted that the two terminals of the bypass device 46 can be connected to any point as desired as long as the group 6B to which the shut-off device 4a is connected is bypassed and also at least one of the terminals of the bypass device 46 is connected to the group 6B without connection to the first open-close unit 44a or the second open-close unit 44b. For example, a configuration is possible in which the anode of the bypass device 46 is connected to the electric path connecting the anode side terminal of the group 6A and second open-close unit 44b and the cathode of the bypass device 46 is connected to the electric path connecting the anode side terminal of the group 6B and the first open-close unit 44a.

The shut-off device 4b has the same configuration as the shut-off device 4a except that the connected electrical path is different from the shut-off device 4a. The shut-off device 4b is connected to an electric path 8c connecting the group 6C and the group 6D and an electric path 8d connecting the group 6D and the group 6E. The shut-off device 4b cuts off the connection between the group 6C and the group 6D and the connection between the group 6D and the group 6E in response to the control signal from the inverter 3.

The shut-off device 4b is driven by the electrical power generated by the solar cell modules 6 of the group 6D. The shut-off device 4a is externally attached to the solar cell modules 6 of the group 6D, for example.

Figure 4:
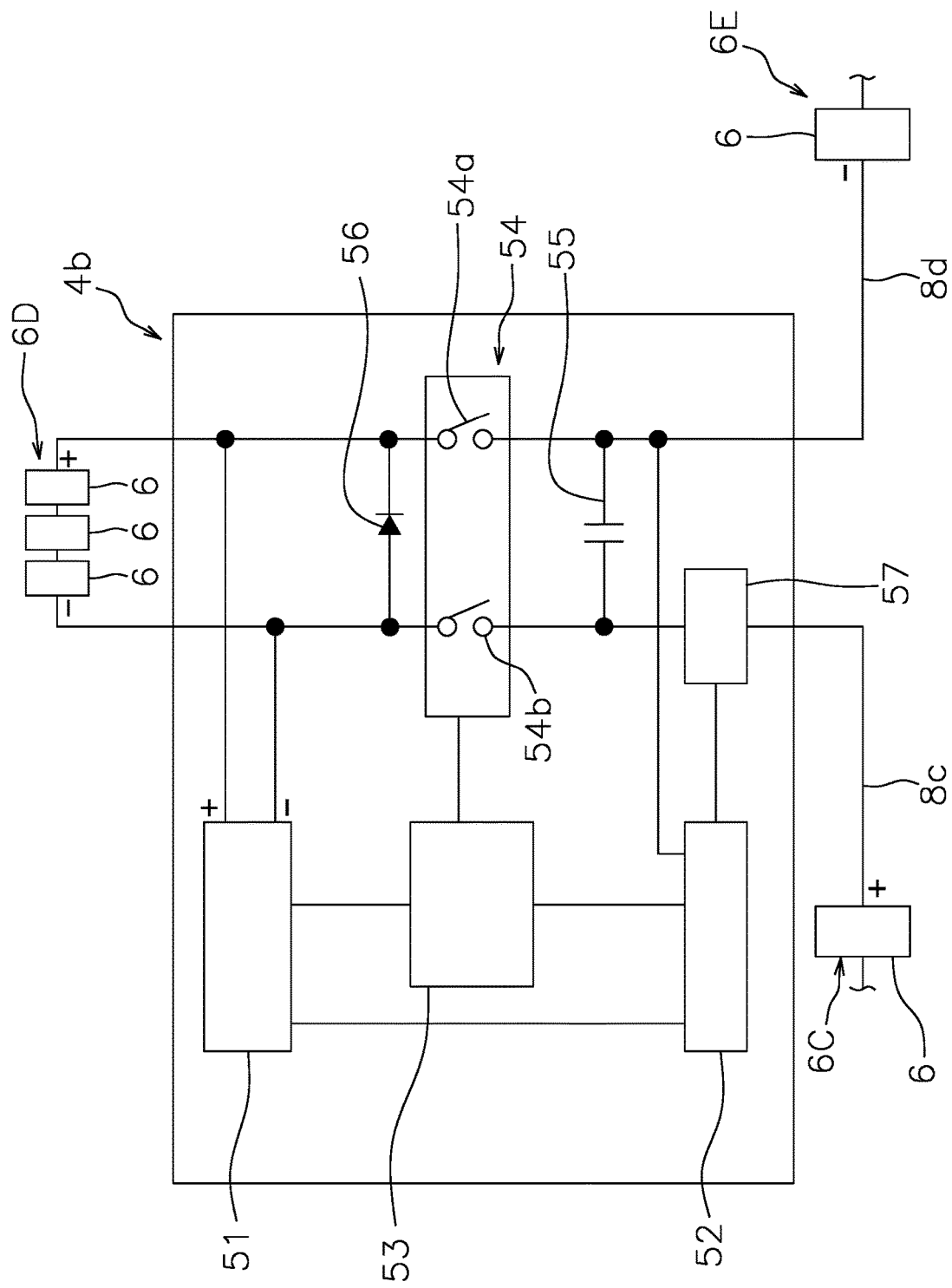
FIG. 4 is a block diagram schematically showing a configuration of a shut-off device.

As shown in FIG. 4, the shut-off device 4b includes a power supply unit 51, a signal receiving unit 52, a control unit 53, a relay 54, a bypass circuit 55, a bypass device 56, and a signal detection unit 57. The relay 54 includes a first open-close unit 54a (an example of a third open-close unit) and a second open-close unit 54b (an example of a fourth open-close unit). Since each configuration of the shut-off device 4b is the same as each configuration of the shut-off device 4a, each configuration of the shut-off device 4b will be briefly described.

The power supply unit 51 uses the electrical power generated by the solar cell module 6 as a power source to generate a drive power for driving the shut-off device 4b. Here, only the power generated by the solar cell modules 6 of the group 6D is used to generate the drive power to drive the shut-off device 4b.

The signal receiving unit 52 receives the control signal from the control unit 3c of the inverter 3 and outputs the received control signal to the control unit 53.

The control unit 53 controls the opening and closing of the contacts of the relay 54. The first open-close unit 54a is connected to the anode-side terminal of the group 6D. The first open-close unit 54a is disposed in the electric path 8d. The first open-close unit 54a opens and closes the connection between the group 6D and the group 6E. The second open-close unit 54b is connected to the cathode-side terminal of the group 6D. The second open-close unit 54b is disposed in the electric path 8c. The second open-close unit 54b opens and closes the connection between the group 6C and the group 6D.

The bypass device 56 is connected in parallel to the group 6D. The bypass device 56 has one end connected between the cathode-side terminal of the group 6D and the second open-close unit 54b. The bypass device 56 has the other end connected between the anode-side terminal of the group 6D and the first open-close unit 54a. The bypass device 56 is, for example, a diode having an anode connected between the cathode-side terminal of the group 6D and the second open-close unit 54b and a cathode connected between the anode-side terminal of the group 6D and the first open-close unit 54a.

The shut-off device 4c has the same configuration as the shut-off device 4a except that the connected electrical path is different from the shut-off device 4a and the shut-off device 4b. That is, the shut-off device 4c includes a power supply unit, a signal receiving unit, a control unit, a relay 64 including a first open-close unit 64a and second open-close unit 64b, a bypass circuit, a bypass device 66, and a signal detection unit. Since each configuration of the shut-off device 4c is the same as each configuration of the shut-off device 4a, a description of each configuration of the shut-off device 4c is omitted.

The shut-off device 4c is connected to an electric path 8e connecting the group 6E and the group 6F and an electric path 8f connecting the group 6F and the inverter 3. The shut-off device 4c cuts off the connection between the group 6E and the group 6F and the connection between the group 6F and the inverter 3 in response to the control signal from the inverter 3.

Next, with reference to FIG. 5, the operation modes of the plurality of shut-off devices 4 will be described mainly using the operation of the shut-off device 4a as an example. The operation modes of the plurality of shut-off devices 4 include a start mode, an active mode, and a safety mode. The safety mode includes a normal shut-off mode and an emergency safety shut-off mode. Thus, the plurality of shut-off devices 4 operates in four operation modes: a start mode, an active mode, a normal shut-off mode, and an emergency safety shut-off mode.

The start mode is a mode for when sunlight starts to hit the solar cell modules 6. At this time, the solar cell modules 6 receive sunlight and generate power. Then, the shut-off device 4a is driven by the drive power generated by the power supply unit 41 using the power generated by the solar cell modules 6 of the group 6B. When the shut-off device 4a is driven and the control unit 43 receives the control signal from the control unit 3c of the inverter 3 via the signal receiving unit 42, the control unit 43 closes the open-close units 44a and 44b of the relay 44.

Similarly, the shut-off device 4b is driven by the drive power generated by the power supply unit 51 of the shut-off device 4b using the power generated by the solar cell modules 6 of the group 6D. When the shut-off device 4b is driven and the control unit 53 receives the control signal from the control unit 3c of the inverter 3 via the signal receiving unit 52, the control unit 53 closes the open-close units 54a and 54b of the relay 54. The shut-off device 4c operates in the same manner as the shut-off device 4a. Consequently, the groups 6A to 6F are connected to the string 2 via the plurality of shut-off devices 4 (the shut-off devices 4a to 4c), and the power generated by the solar cell modules 6 is output to the inverter 3.

The active mode is a state in which the solar cell modules 6 receive sunlight during the daytime to generate power, and is substantially the same as the start mode. Thus, in the active mode, the groups 6A to 6F are in connection with each other via the plurality of shut-off devices 4 (the shut-off devices 4a to 4c), and the power generated by the solar cell modules 6 is output to the inverter 3.

The normal shut-off mode is a mode for when the solar cell modules 6 are not exposed to sunlight at night or due to the influence of bad weather such as rain, or when the power generation of the solar cell modules 6 is unstable. In the normal shut-off mode, when the solar cell modules 6 do not generate power, the control unit 3c of the inverter 3 does not output the control signal. Thus, in the normal shut-off mode, the first open-close units and the second open-close units of the shut-off devices 4a to 4c are all in the open state.

In the normal shut-off mode, when the power generation by the solar cell modules 6 of the group 6B is unstable due to the unstable weather or the like, the control signal is output from the control unit 3c of the inverter 3. For example, when the power generation by the group 6B is unstable, the open-close units 44a and 44b of the relay 44 are turned into the ON/OFF state depending on the power supplied from the solar cell modules 6 of the group 6B. Even if the amount of power generated by the group 6B is small, the power generated by another solar cell module group can be transferred to the inverter 3 via the bypass device 46 if the open-close units 44a and 44b of the relay 44 are in the ON state.

The emergency safety shut-off mode is a mode in which the electric paths 8a to 8f are cut off so that the power supply from the solar cell modules 6 to the inverter 3 is stopped during the start mode or the active mode. In the present embodiment, as shown in FIG. 1, an operation switch 35 is connected to the inverter 3. When the operation switch 35 is operated during the start mode or the active mode of the plurality of shut-off devices 4, the operation mode of the plurality of shut-off devices 4 is switched to the emergency safety shut-off mode.

Specifically, when the operation switch 35 is operated, the control unit 3c stops the output of the control signal. When the signal detection unit 47 detects the stop of the control signal of a fixed cycle, the open-close units 44a and 44b of the relay 44 are opened via the signal receiving unit 42 and the control unit 43. As a result, the connection between the group 6A and the group 6B and the connection between the group 6B and the group 6C are cut off.

Similarly, when the shut-off device 4b detects the stop of the control signal of a fixed cycle, the shut-off device 4b causes the open-close units 54a and 54b of the relay 54 to open. As a result, the connection between the group 6C and the group 6D and the connection between the group 6D and the group 6E are cut off. Similarly, when the shut-off device 4c detects the stop of the control signal of a fixed cycle, the shut-off device 4c causes the open-close units 64a and 64b of the relay 64 to open. As a result, the connection between the group 6E and the group 6F and the connection between the group 6F and the inverter 3 are cut off. As a result, all the groups 6A to 6F are separated from each other, so that the open circuit voltage of the string 2 is divided into 165V or less.

In the solar power generation system 1 of the above configuration, because the plurality of solar cell module groups 6A to 6F each have an open circuit voltage of 165 V or less, a highly safe solar power generation system can be provided. Since the connection of the plurality of groups can be cut off with one shut-off device 4a, the installation cost of the plurality of shut-off devices 4 can be reduced as compared with the case where a shut-off device is installed for each solar cell module. In addition, it is possible to provide a safer solar power generation system as compared with the case of severing the plurality of solar cell modules 6 and the inverter 3 in a string unit. Further, even if the amount of power generated by the group 6B decreases, the power generated by another solar cell module group can be transferred to the inverter 3 via the bypass device 46. The same effect as that of the shut-off device 4a can be achieved by the shut-off device 4b and the shut-off device 4c.

One embodiment of the present invention has been described above, but the present invention is not limited to the above embodiment, and various modifications are possible as long as the modifications are within the scope of the disclosure.

The number of groups of the plurality of solar cell module groups or the number of solar cell modules included in each group is not limited to the above embodiment. The string 2 may be divided into a plurality of solar cell module groups as long as each group has an open circuit voltage of 165 V or less. Similarly, in the above embodiment, the plurality of shut-off devices 4 include three shut-off devices 4a to 4c, but the number of plurality of shut-off devices 4 is not limited to the above embodiment.

Figure 6:
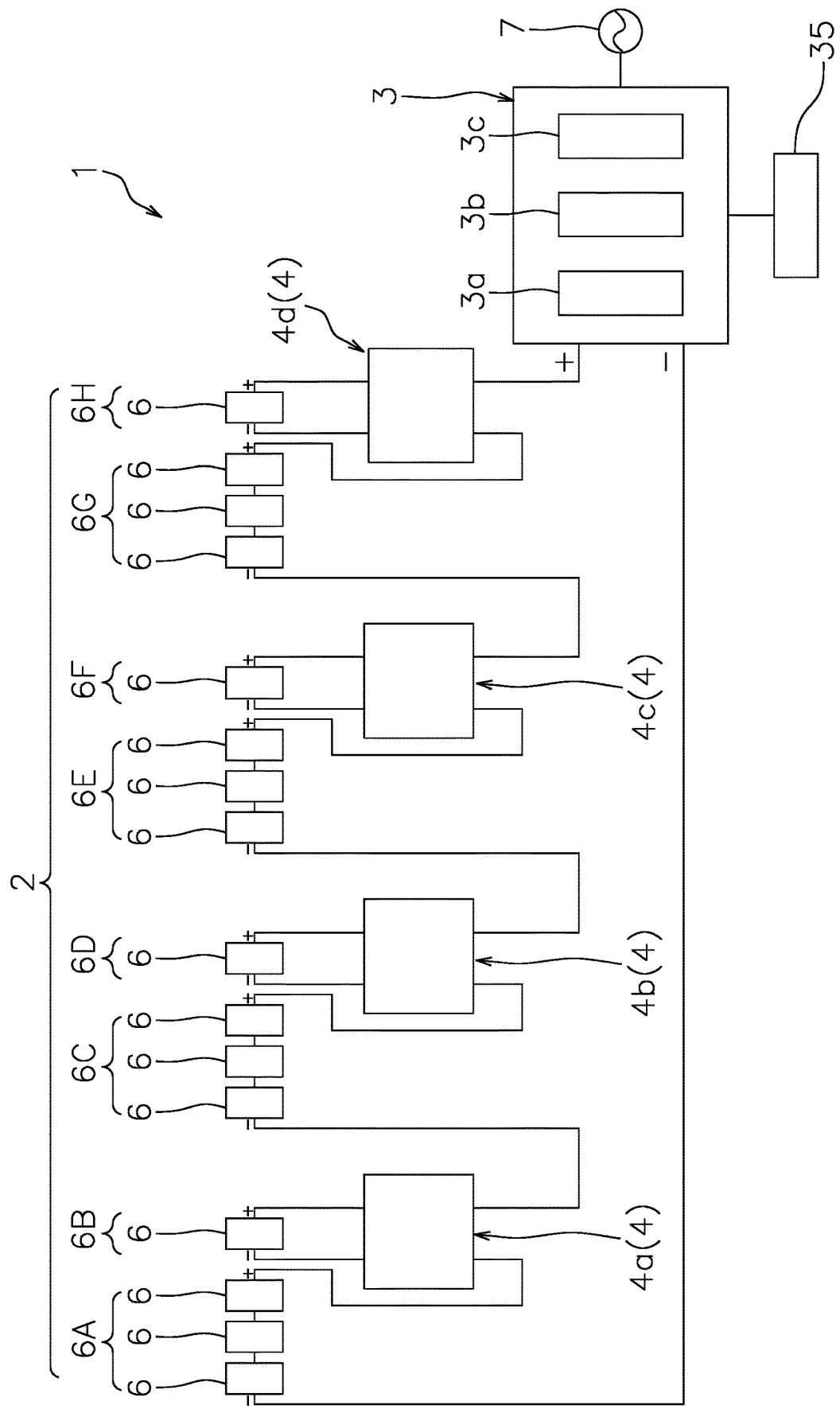
FIG. 6 is a block diagram schematically showing a configuration of a solar power generation system according to another embodiment.

As shown briefly in FIG. 6, the plurality of shut-off devices 4 may be disposed so that the open voltage of the string 2 is divided into 165 V or less at the time of cutoff. In FIG. 6, the plurality of shut-off devices 4 include four shut-off devices 4a to 4d. Each of the groups 6A, 6C, 6E, and 6G includes three solar modules 6 connected in series with each other, and each of the groups 6B, 6D, 6F, and 6H includes one solar module 6. Thus, each of the open circuit voltage of the groups 6A, 6C, 6E, and 6G is 150 V, and each of the open circuit voltage of the groups 6B, 6D, 6F, and 6H is 50 V. Alternatively, at least one of the plurality of solar cell module groups may include two solar modules 6.

Figure 7:
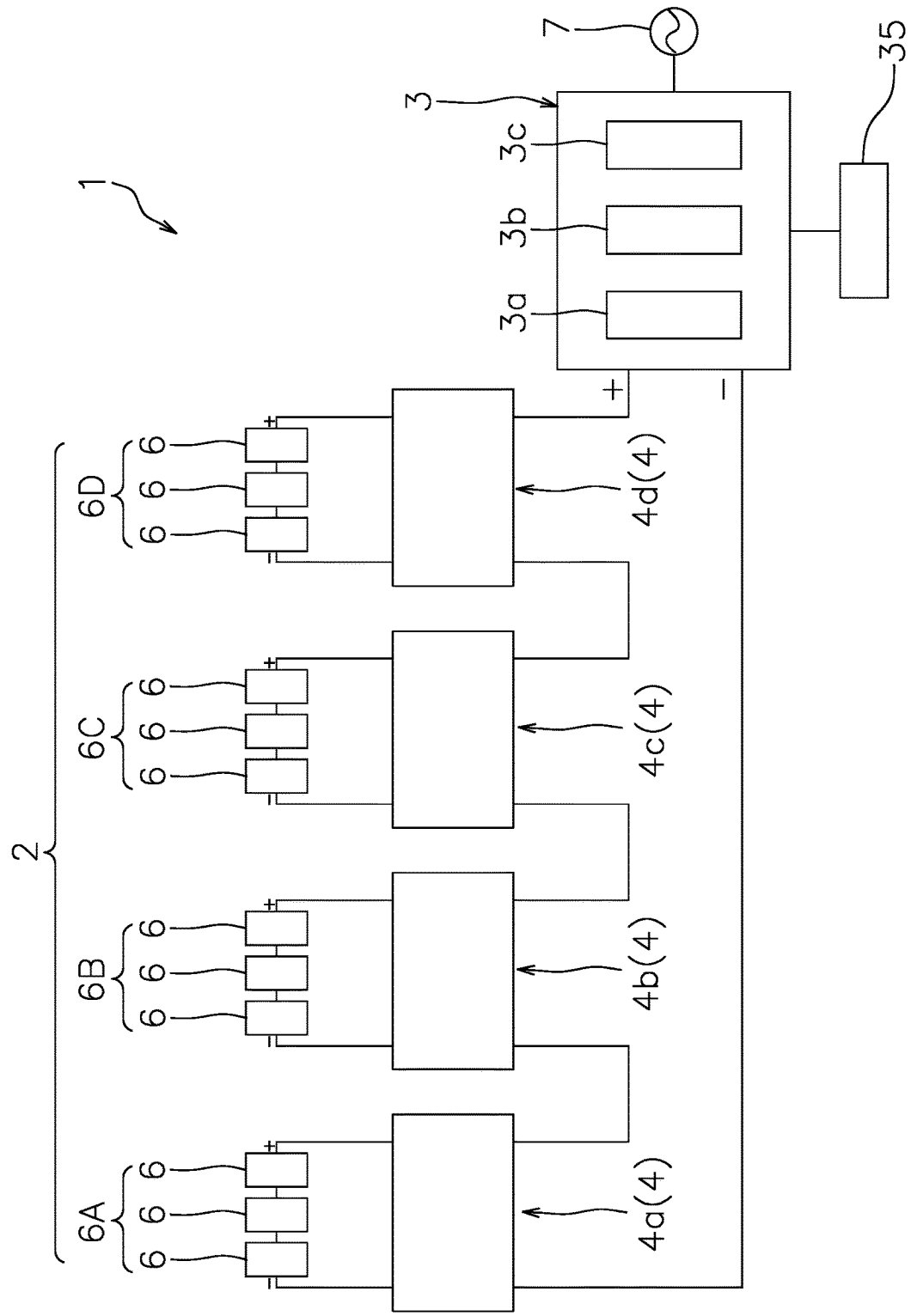
FIG. 7 is a block diagram schematically showing a configuration of a solar power generation system according to another embodiment.

As shown briefly in FIG. 7, the plurality of shut-off devices 4 may be disposed in each of the plurality of solar module groups. In this case, each of the plurality of solar module groups preferably includes a plurality of solar cell modules 6.

Figure 8:
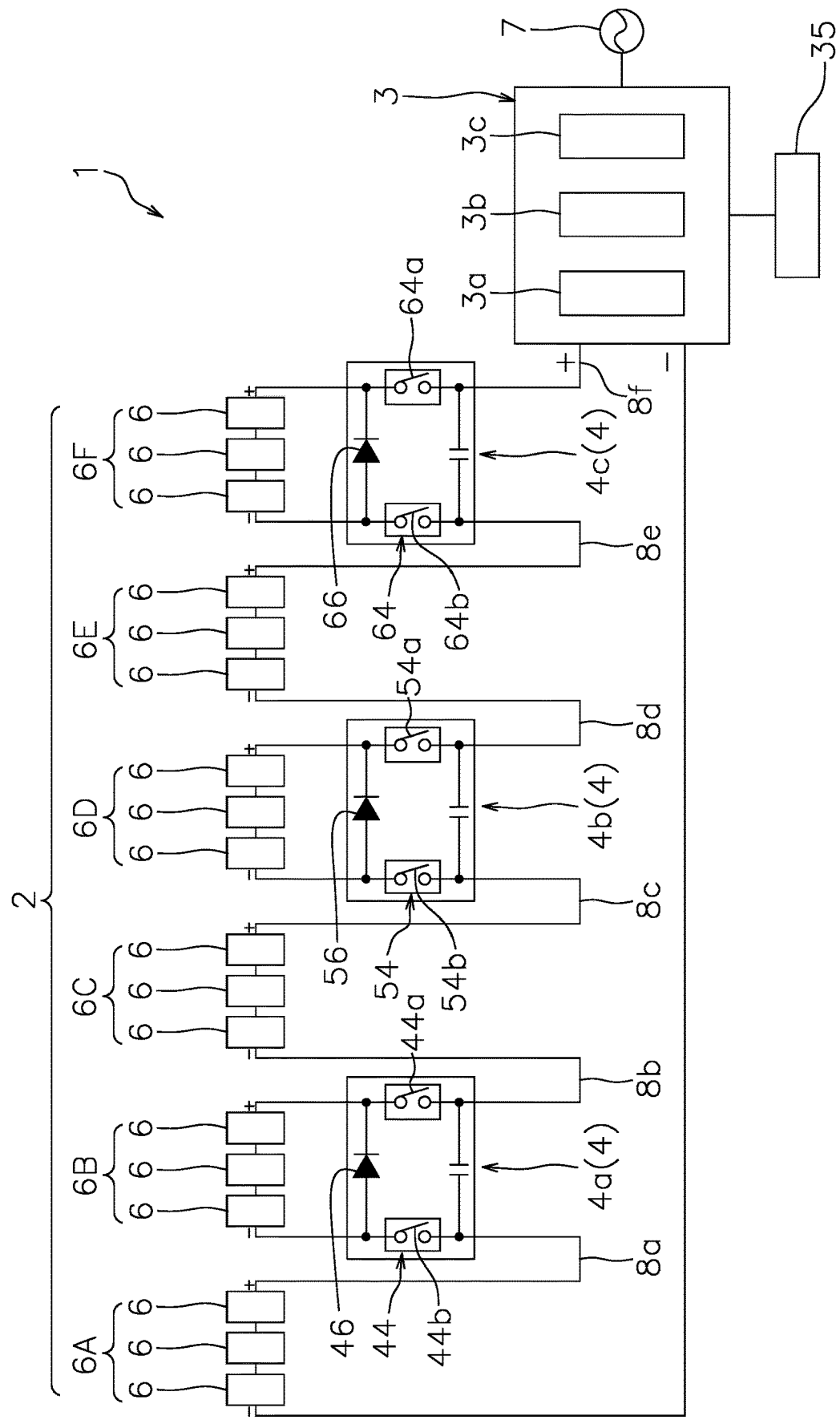
FIG. 8 is a block diagram schematically showing a configuration of a solar power generation system according to another embodiment.

In the above embodiment, the relay 44 of the shut-off device 4a has two contacts of the first open-close unit 44a and the second open-close unit 44b, but as shown briefly in FIG. 8, the relay 44 may be two relays having a single contact. That is, the shut-off device 4a may be configured to independently control the opening and closing of the first open-close unit 44a and the second open-close unit 44b. Similarly, the shut-off device 4b may be configured to independently control the opening and closing of the first open-close unit 54a and the second open-close unit 54b. Similarly, the shut-off device 4c may be configured to independently control the opening and closing of the first open-close unit 64a and the second open-close unit 64b.

In the above embodiment, the control signal is output to the plurality of shut-off devices 4 by power line communication, but the control signal may be output to the plurality of shut-off devices 4 by wireless communication such as Wi-Fi®. Alternatively, the inverter 3 and the plurality or shut-off devices 4 may be configured to be in communication with each other by wireless communication.

The control signal from the inverter 3 may be stopped in modes other than the emergency safety shut-off mode or as a part of the normal shut-off mode (i.e., "NO" in "POWER GENERATION" in FIG. 5), and the control signal from the inverter 3 may be output in the emergency safety shut-off mode or as a part of the normal shut-off mode. In this case, the plurality of shut-off devices 4 may open the first open-close unit and the second open-close unit upon receiving the control signal from the inverter 3, and may close the first open-close unit and the second open-close while not receiving the control signal.

REFERENCE NUMERALS

1 Solar power generation system
2 String
3 Inverter
4 Plurality of shut-off devices 4a Shut-off device (example of first shut-off device)
4b Shut-off device (example of second shut-off device)
6 Solar cell module
44a First open-close unit
44b Second open-close unit
45 Bypass circuit
46 Bypass device (example of first bypass device)
47 Signal detection unit

The invention claimed is:

1. A solar power generation system, comprising:
a string including a plurality of solar cell module groups connected in series with each other, the plurality of solar cell module groups each including one or more solar cell modules connected in series with each other;
an inverter connected to the string, the inverter being configured to convert DC power output from the string to AC power; and
a plurality of shut-off devices configured to cut off electrical connections between the plurality of solar cell module groups in response to a control signal from the inverter,
wherein the plurality of solar cell module groups each have an open circuit voltage equal to or less than a predetermined open circuit voltage,
the plurality of solar cell module groups includes a first group, a second group connected to the first group, and a third group connected to the second group,
the plurality of shut-off devices includes a first shut-off device including a first open-close unit connected to an anode-side terminal of the second group and a second open-close unit connected to a cathode-side terminal of the second group, and
the first shut-off device includes a signal receiving unit configured to receive the control signal from the inverter, and a bypass circuit configured to cause the signal receiving unit to receive the control signal from the inverter in a state where the connection between the plurality of solar cell module groups is shut off.

2. A solar power generation system, comprising:
a string including a plurality of solar cell module groups connected in series with each other, the plurality of solar cell module groups each including one or more solar cell modules connected in series with each other;
an inverter connected to the string, the inverter being configured to convert DC power output from the string to AC power; and
a plurality of shut-off devices configured to cut off electrical connections between the plurality of solar cell module groups in response to a control signal from the inverter, wherein
the plurality of solar cell module groups each have an open circuit voltage equal to or less than a predetermined open circuit voltage,
the plurality of solar cell module groups includes a first group, a second group connected to the first group, and a third group connected to the second group,
the plurality of shut-off devices includes a first shut-off device including a first open-close unit connected to an anode-side terminal of the second group and a second open-close unit connected to a cathode-side terminal of the second group,
the plurality of solar cell module groups further includes a fourth group connected to the third group, and a fifth group connected to the fourth group,
the plurality of shut-off devices further includes a second shut-off device including a third open-close unit connected to an anode-side terminal of the fourth group and a fourth open-close unit connected to a cathode-side terminal of the fourth group, and
the second shut-off device further includes a second bypass device connected in parallel with the fourth group.

3. The solar power generation system according to claim 1, wherein the first shut-off device further includes a first bypass device connected in parallel with the second group.

4. The solar power generation system according to claim 1, wherein the first shut-off device is configured in a manner that allows opening and closing of the first open-close unit and the second open-close unit to be controlled independently of each other.

5. The solar power generation system according to claim 1, wherein the first shut-off device is driven by an electrical power generated by the second group.

6. The solar power generation system according to claim 1, at least one of the first group, the second group, or the third group of the plurality of solar cell module groups includes the plurality of solar cell modules connected in series.

7. The solar power generation system according to claim 1, wherein the predetermined open circuit voltage is 165 V.

8. The solar power generation system according to claim 1, wherein the inverter is configured to output the control signal to the plurality of shut-off devices by power line communication.

9. The solar power generation system according to claim 1, wherein the inverter is configured to output the control signal to the plurality of shut-off devices by wireless communication.

10. The solar power generation system according to claim 2, wherein the second shut-off device is configured in a manner that allows opening and closing of the third open-close unit and the fourth open-close unit to be controlled independently of each other.

11. The solar power generation system according to claim 2, wherein the second shut-off device is driven by an electrical power generated by the fourth group.

12. The solar power generation system according to claim 2, wherein at least one of the third group, the fourth group, or the fifth group of the plurality of solar cell module groups includes the plurality of solar cell modules connected in series.

13. The solar power generation system according to claim 2, wherein the predetermined open circuit voltage is 165 V.

14. The solar power generation system according to claim 2, wherein the inverter is configured to output the control signal to the plurality of shut-off devices by power line communication.

15. The solar power generation system according to claim 2, wherein the inverter is configured to output the control signal to the plurality of shut-off devices by wireless communication.

* * * * *